(12) United States Patent
Chen

(10) Patent No.: US 7,555,840 B2
(45) Date of Patent: Jul. 7, 2009

(54) OMNI-DIRECTIONAL LENS IN SUNDIALS AND SOLAR COMPASSES

(75) Inventor: Chengjun Julian Chen, White Plains, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 7 days.

(21) Appl. No.: 11/840,428

(22) Filed: Aug. 17, 2007

(65) Prior Publication Data

US 2009/0044417 A1    Feb. 19, 2009

(51) Int. Cl.
*G04B 49/00* (2006.01)
*G01C 17/34* (2006.01)
(52) U.S. Cl. .......................................... 33/269; 33/270
(58) Field of Classification Search ........... 33/268–270, 33/1 DD, 1 CC
See application file for complete search history.

(56) References Cited

U.S. PATENT DOCUMENTS

| | | | |
|---|---|---|---|
| 1,674,161 A * | 6/1928 | De Bogory ................. | 33/270 |
| 4,028,813 A * | 6/1977 | Eldridge ..................... | 33/270 |
| 4,384,408 A | 5/1983 | Bohlayer | |
| 4,387,999 A * | 6/1983 | Shelley ....................... | 33/270 |
| 4,520,572 A | 6/1985 | Spilhaus | |
| 4,656,748 A * | 4/1987 | Thual ......................... | 33/270 |
| 4,835,875 A | 6/1989 | Fuller | |
| 4,899,451 A | 2/1990 | Dandurand | |
| 4,945,644 A * | 8/1990 | Fuller ......................... | 33/270 |
| 5,197,199 A | 3/1993 | Shrader | |
| 5,425,178 A | 6/1995 | Steele | |
| 5,459,931 A | 10/1995 | Waltho | |
| 6,301,793 B1 | 10/2001 | Gottesman et al. | |
| 6,604,290 B1 | 8/2003 | Hughes, Jr. | |
| 7,114,262 B2 | 10/2006 | Andrewes | |

* cited by examiner

*Primary Examiner*—Yaritza Guadalupe-McCall
(74) *Attorney, Agent, or Firm*—Wiggin and Dana LLP; Anthony P. Gangemi

(57) ABSTRACT

Sundials and solar compasses including are disclosed. Some embodiments include an omni-directional lens, which can focus a sun beam into a sharp spot with a long depth of field. By projecting the spot onto a cylindrical panel, both the day of the year and the time of the day can be read off simultaneously with very high accuracy. Because of the simultaneous displaying of time and date, no equation-of-time correction is required. If the time is known, the true north can be determined with high accuracy, and the device becomes a reliable and easy-to-use solar compass.

12 Claims, 5 Drawing Sheets

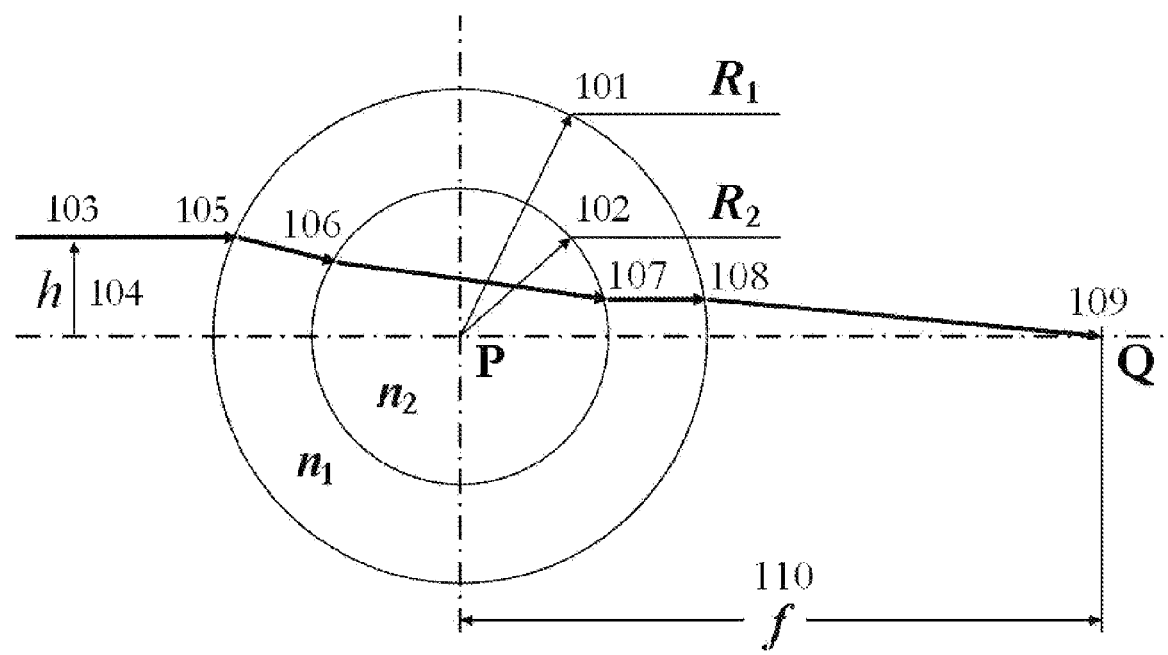
FIG. 1 Chen
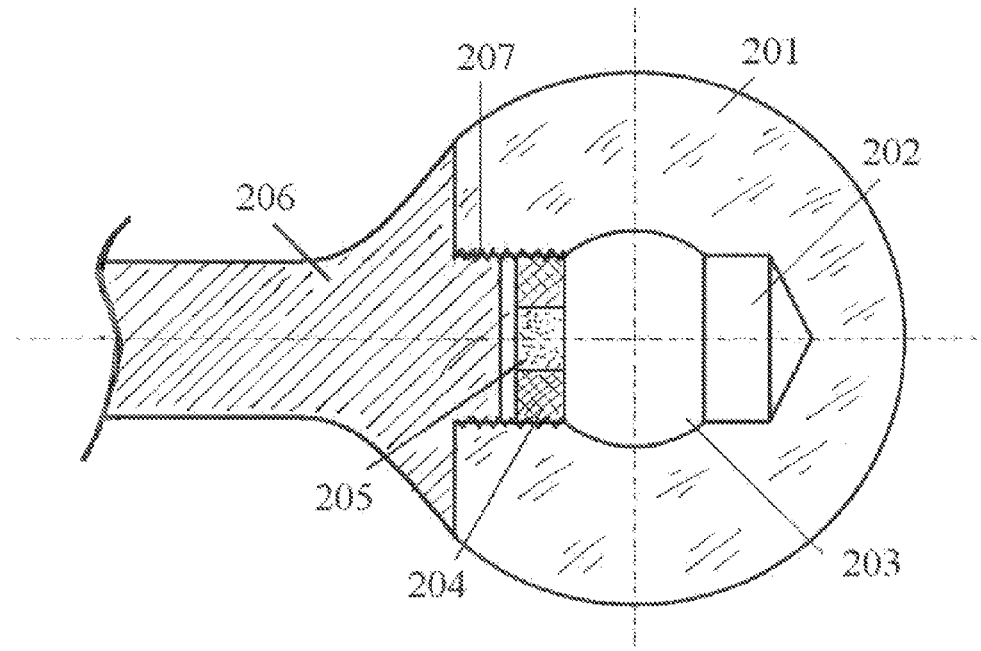
FIG.2 Chen

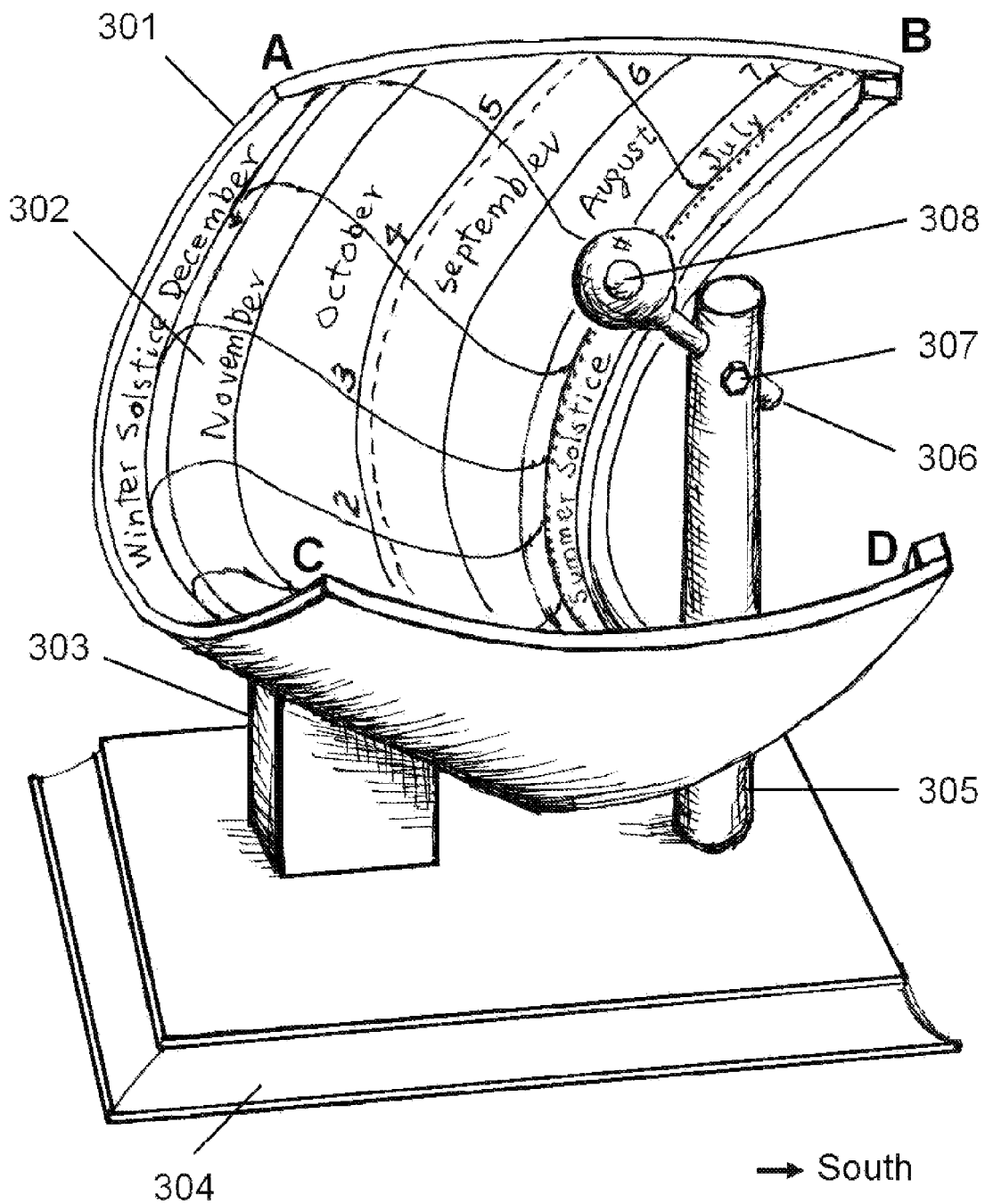
FIG. 3 Chen

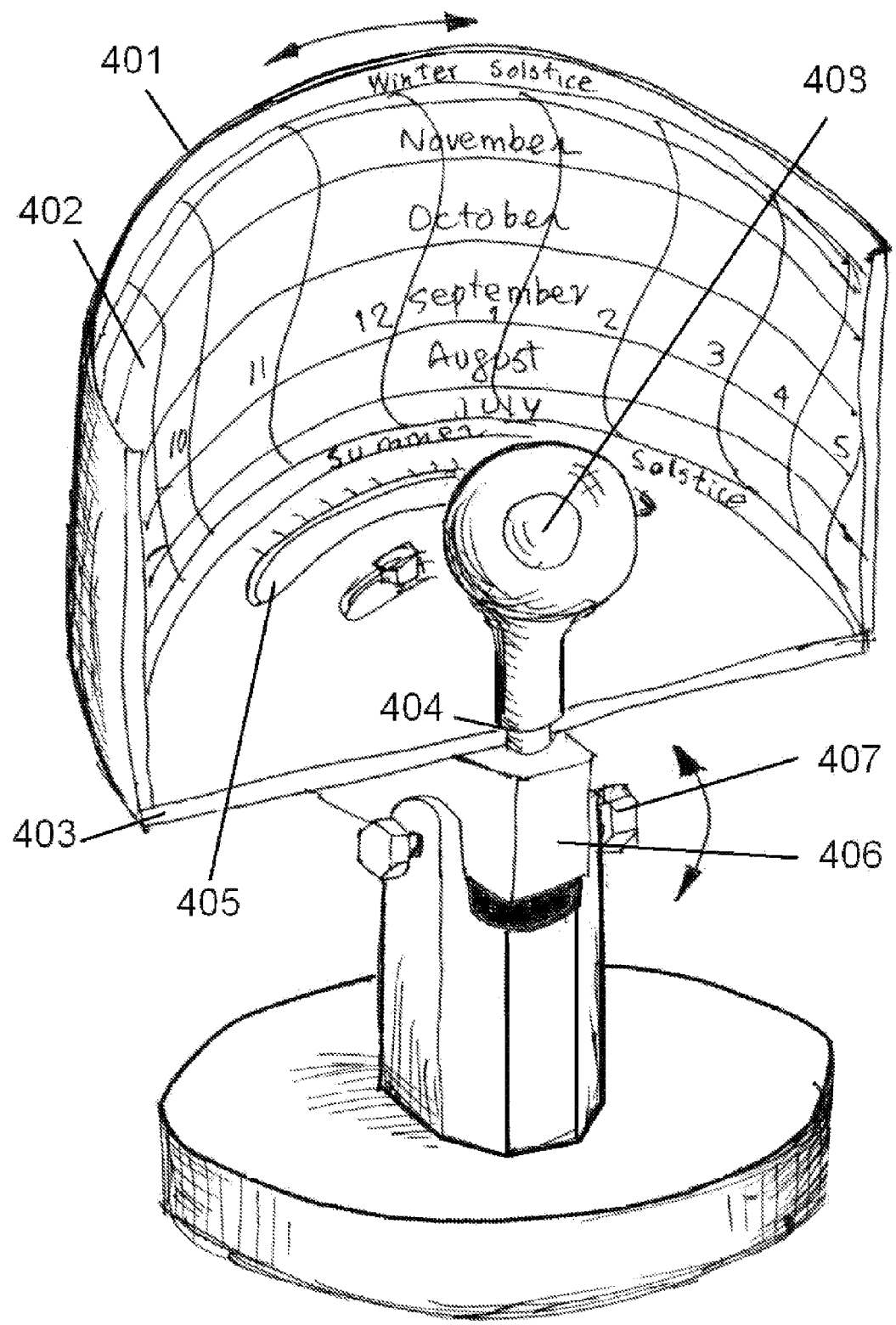
FIG. 4 Chen

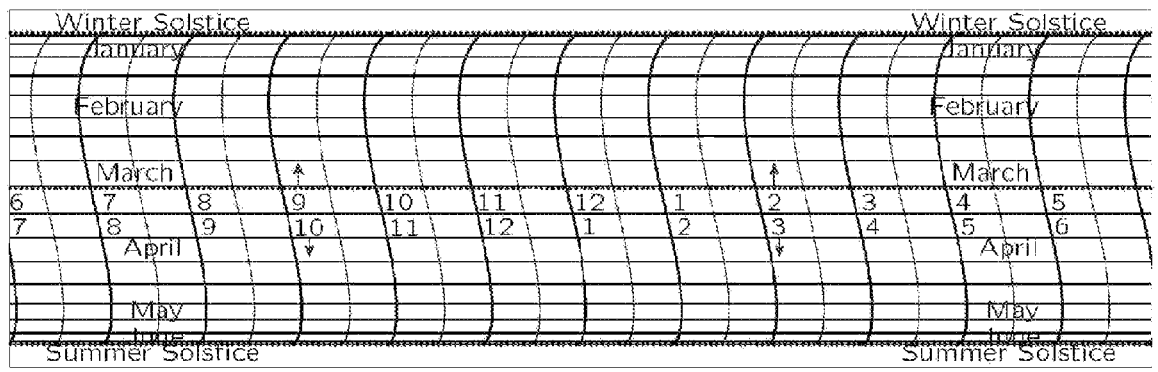
FIG. 5 Chen
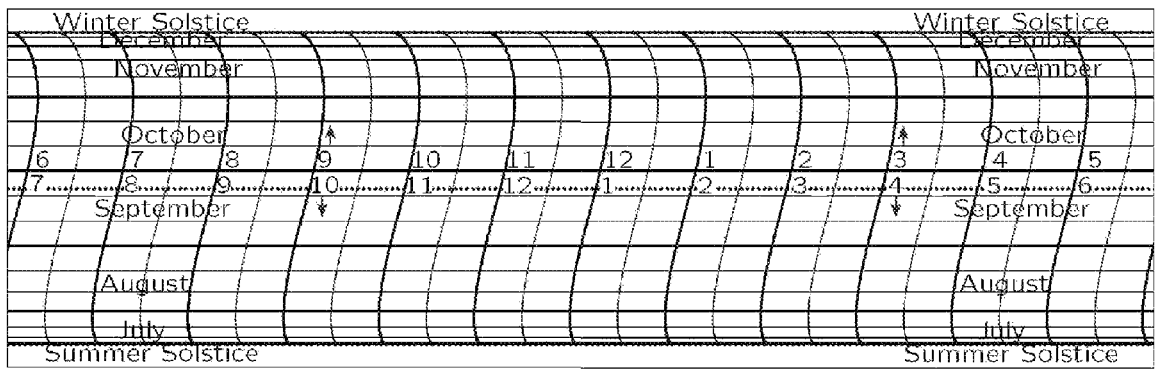
FIG. 6 Chen

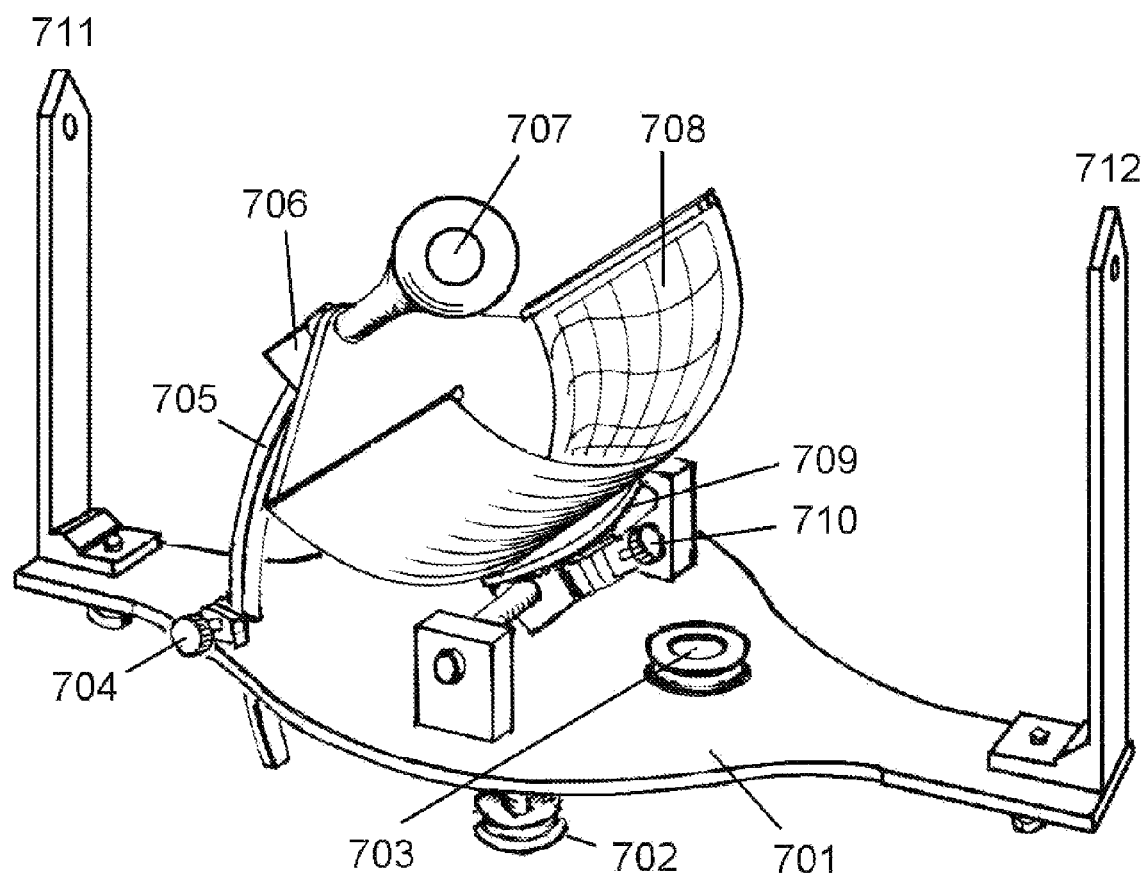
FIG. 7 Chen

OMNI-DIRECTIONAL LENS IN SUNDIALS AND SOLAR COMPASSES

BACKGROUND

The sundial is one of the earliest scientific instruments created by mankind. Thousands of years ago, almost every culture of the world independently discovered the principle of determine the day in a year and the time in a day by observing the position of the sun, and invented some type of the sundial. Although the mechanical clock was invented in the 16th century, until late $19^{th}$ century, the sundial was still used as a reliable time piece in Europe. Even more recently, novel types of sundials are being invented. Most known sundials use a gnomon, which is an opaque piece of solid material that can project a shadow on a panel. The gnomon can be a long and thin opaque stylet or an opaque sphere. Because the sun has a finite radius, the shadow is typically fussy. Some sundials use a hole and or equivalently, a mirror to project a bright spot on the panel instead of a dark shadow. Because the angle of rotation of the sun often exceeds 180 degree, the hole can only be effective for a small range of angles, thus its usefulness is limited. To improve the sharpness of the image, some sundials use a concave mirror or a cylindrical mirror to focus the sun beam. However, the focus surface is a special curved surface in the three-dimensional space, which must be strictly arranged and followed. And, similar to the case of curved mirrors, if the sun beam is seriously off the axis, the sharpness of the image is low.

Another problem with the traditional sundials is that the angular position of the sun depends on the day of the year. The difference of the solar time and the average time is represented by the well-known equation of time. The error could be a large fraction of an hour. Therefore, the accuracy of the sundial is limited, especially the stylet and cylindrical-mirror type. Usually, a conversion table or conversion chart is attached to a sundial for the equation-of-time correction.

The magnetic compass is widely used for determining directions. However, the position of the magnetic North Pole is off about 10° from the true North Pole, and the magnetic South Pole is off about 25° from the true South Pole. In the United States, the error (magnetic inclination) could be as large as 20°. The magnetic inclination also varies year by year. Furthermore, the magnetic compass is greatly affected by the ferromagnetic materials in the neighborhood of a compass, e.g., iron ore in the ground or any steel or iron pieces.

In 1834, W. A. Burt invented the solar compass which uses the position of the sun to determine the true north. Because of its reliability and accuracy, since the middle of the $19^{th}$ century, the US government defined the solar compass as the standard for land surveying. The solar compass is also used in the military for reliably determining the directions in the battle field. However, the operation of known solar compasses is complicated and requires the calculation of the local solar time versus the local standard time at the time of measurement, and requires elaborate manual adjustments. When a gnomon is used, the same inaccuracy problem with the sundials, the fussiness of the image and the equation of time, is present.

It is well known that a convex lens can focus sunlight into a sharp spot. However, it works only when the position of the sun is aligned with the axis of the lens. When the sun is slightly off the axis, the image is distorted. If the sun is seriously off the axis, the image is grossly distorted and eventually disappears. Furthermore, the depth of field is usually quite shallow. The use of convex lens in solar compass requires manual adjustment to align the axis with the sun.

SUMMARY

As illustrated in FIG. 1, aspects of the disclosed subject matter include an optical device for projecting the center of the sun from any direction to form a sharp spot of light onto a panel. It comprises two concentric spheres. The outer sphere with radius $R_1$ is made of a transparent material with index of refraction $n_1$, and the inner sphere with radius $R_2$ is made of another transparent material of index of refraction $n_2$. Under the condition $n_1 > n_2$, and $R_1 > R_2$, the parallel light comes from any direction will be focused on a spot at a distance f at the opposite side of the sphere. Such a lens is called omni-directional. The omni-directional lens does not generate an image of the sun in the strict sense. Instead, it generates a distribution of light intensity with a sharp center spot which can be easily identified by naked eye, or by a light sensor. The position of the center of the sun can be determined much finer than the apparent diameter of the sun, which is about 0.5 degree (32'). The focal length is not a sharp, fixed number. Instead, it has a range. In this sense, such a lens has a large depth of field.

The center of the light spot has a much higher intensity than the direct sunlight. It makes the center spot very easy to be identified. To avoid burning the panel, at least one of the spheres is made of a heat absorbing material, for example, doped with copper sulfate. With copper sulfate, only the blue light can go through the lens. Furthermore, by using a panel with dark blue background, the brightness of the area exposed to direct sunlight is substantially reduced, and the bright blue spot projected through the omni-directional lens becomes even more eye-catching.

Because of the large depth of field, the center of the sun can be projected on a cylindrical panel without loosing its sharpness over the entire area. A precise printout of the path of the sun can be easily made, which can provide a highly accurate reading. Because both the day of the year and the time of the day can be identified, the correction due to the equation of time is done automatically and accurately. By using two panels per year (from one solstice to another solstice), the daylight saving time can be marked directly.

If the time and the date are known, the instrument can be configured as a compass. The principle of the solar compass is not new. However, to use existing solar compasses, the instantaneous position of the sun must be calculated from astronomical data one by one, and the operator must wait the predetermined time to come. This consumes a lot of time and requires a profound knowledge on astronomy. For the solar compass based on the omni-directional lens, the astronomical information is explicitly marked on the panel. Therefore, it operation is independent of time, very intuitive, and easy to use.

BRIEF DESCRIPTION OF THE DRAWINGS

FIG. 1 is a diagram showing how an omni-directional lens according to some embodiments of the disclosed subject matter focus sunlight beams.

FIG. 2 is a side section view of an omni-directional lens according to some embodiments of the disclosed subject matter.

FIG. 3 is a front isometric view of a stationary sundial using an omni-directional lens according to some embodiments of the disclosed subject matter.

FIG. 4 is a front isometric view of a portable sundial using an omni-directional lens according to some embodiments of the disclosed subject matter.

FIG. 5 is a diagram of a panel according to some embodiments of the disclosed subject matter, which includes markings for the first half of the year.

FIG. 6 is a diagram of a panel according to some embodiments of the disclosed subject matter, which includes markings for the second half of the year.

FIG. 7 is a front isometric view of a solar compass using an omni-directional lens according to some embodiments of the disclosed subject matter.

DETAILED DESCRIPTION

The principle of the omni-directional lens is shown in FIG. 1. It is a sphere comprises two concentric components. The outer sphere 101 with radius $R_1$ is made of a transparent material with index of refraction $n_1$. The inner sphere 102 with radius $R_2$ is made of another transparent material of index of refraction $n_2$. When a light beam 103 impinges on the lens with an offset h from the axis, owing to the difference in the index of refraction, the beam is refracted four times on the four surfaces, 105, 106, 107, and 108. Detailed mathematical analysis shows that under the conditions $n_1 > n_2$ and $$\frac{R_2}{R_1} > \frac{n_1 - n_2}{(n_1 - 1)n_2},$$

all rays with the same h will converge at a point Q (109) on the axis with a finite distance f (110) from the center of the sphere P. In general, for rays with different h, the focal length f is different. Since the rays with the same offset h converge at the same spot at the axis, it creates a light spot with very high intensity. However, all the rays with different h will be divergent and have much lower intensity comparing with that of the central spot. Because the lens is spherically symmetric, parallel light rays coming from any direction will be focused the same way. Therefore, the effect of light focusing is omni-directional.

The theoretically predicted focusing effect is experimentally verified. For example, for $n_1 = 1.50$ (Lucite) and $n_2 = 1.33$ (water), a lens with $R_1 = 25$ mm and $R_2 = 9.3$ 11 mm generates a focal distance from 60 mm to 75 mm. In other words, the average focal length if 67.5 mm and the depth of field is 15 mm.

For applications in sundial and solar compass, it is not necessary to have the omni-directional focusing effect over the entire sphere. For the longitude, 360 degree is required. However, since the tropic circle is 23.5 degrees from the equator, a 60 degree latitude range is sufficient.

As shown in FIG. 2, the raw material for the lens is a solid Lucite sphere, 201. The first step is to drill a cylindrical hole 202. The second step is to cut the interior sphere 203 with a special cutting and a special grinding tool. Then, a Lucite plug 204 is placed and sealed with silicone gel. The pug 204 has a hole 205 which is filled with silicone gel. The cavity 203 is than filled with aqueous solution of copper sulfate using a syringe through the silicone gel 205. The remaining air is letting out by another syringe through the same piece of silicone gel. After filling, the silicone gel will provide a good seal for the liquid. Finally, the lens is mounted on a metal handle 206 through the thread 207.

An example of a stationary sundial using a spherical omni-directional lens is shown in FIG. 3. The cylindrical shell 301 with a replaceable panel 302 is supported by the foot 303, which is adjusted to the latitude of the location. The upper surface ABCD is leveled. On the base plate 304, erects a vertical post 305. The omni-directional lens with handle 306, is fixed to the post by a screw 307. The center of the lens, 308, is located at the center of the ABCD plane.

The panel 302, preferably having a blue background and dark-blue of black markings, is designed according to the local longitude to correct for the difference between the local solar time and the local standard time. To ensure accurate readings, it is preferable to have a Spring panel (from the Winter solstice of the last year to the summer solstice of the current year), and a Fall panel (from the Summer solstice to the Winter solstice). If the size of the panel is a relatively large, the accuracy of the sundial could easily reach a single day except in the neighborhood of the solstices. Therefore, the daylight saving time can be marked on the panel.

The above sundial can be used only at a specific location. A sundial can be used for any location, a portable sundial, is shown in FIG. 4, with adjustments for both latitude and longitude. The semi-cylindrical penal holder 401 holds the replaceable panel 402. The semi-cylindrical panel holder is mounted on a semicircular base plate 403. Plate 403 can be rotated around the axis 404 of the handle of the omni-directional lens, to adjust for the difference of local solar time and local standard time. The angle of adjustment can be read off from the slot 405 against the rectangular piece 406. The rectangular piece 406 in turn can be rotated around the axis 407 to make adjustment for the latitude. The height of the center of the lens 408 is aligned with the middle of the panel 402.

The design of the panels is shown in FIG. 5 and FIG. 6. The equation-of-time correction is fully implemented. If the panel is large, every day of the year, including the weekdays, can be displayed. Therefore, the starting date and the ending date of daylight saving time can be marked.

By letting the device to rotate horizontally, the sundial with an omni-directional lens can be configured as an accurate and easy-to-use solar compass. An example of the design of a solar compass is shown in FIG. 7. The base plate 701 is sitting on three feet 702, two of the three are screws to adjust the plate with the help of the level 703. Screw 704 is used to adjust the latitude arc 705, which sets the inclination of the rectangular bar 706. The omni-directional lens 707 is supported on the rectangular bar 706, and the handle of the lens is acting as the axis of rotation of the panel holder 708. The longitude arc 709 is adjusted by the screw 710. The tip 711 is the south pointer; and the tip 712 is the north pointer. It is worth noting that for a solar compass, it is not necessary to display the 12 hours. For the normal working days, 10 hours (for example, 8 am to 6 pm) is sufficient. The panel could span over 150 degrees rather than 180 degrees.

To use it, first adjust the base plate using screws 720 with the help of level 703. Then, adjust the latitude and longitude to match the location of measurement using screws 704 and 710. To find the true north, just rotate the base place such that the sun beam is focused on the current local time and the current date. The tips should point to the true North and true South. It is worth noting that when rotating the base place, both the date reading and the time reading would change. This will provide a consistency check.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A sundial, said sundial comprising:
   an omni-directional lens including at least two concentric spherical components, said at least two concentric spherical components including a transparent outer sphere having a radius R1 and an index of refraction n1 and a transparent inner sphere having a radius R2 and an index of refraction n2; and
   a replaceable panel positioned adjacent said omni-directional lens, said replaceable panel being selected from two replaceable panels, each of said two replaceable panels having a semi-cylindrical shape and a surface having marks of date and time thereon, a first one of said two replaceable panels including marks of date and time for a first part of a year and a second one of said two replaceable panels including marks of date and time for a second part of the year;
   wherein R1, n1, R2, and n2 are selected so that a parallel beam of sunlight impinging on said omni-directional lens will converge to a sharp spot of light on said replaceable panel thereby indicating a time of a day and a day of a year.

2. The sundial according to claim 1, wherein said surface is blue.

3. The sundial according to claim 2, further comprising means to adjust an inclination of said replaceable panel to match a local latitude and means to adjust an azimuth angle to match a local longitude, thereby allowing one to correct for a difference between a local solar time and local standard time.

4. The sundial according to claim 1, wherein said outer sphere is manufactured from a plastic sphere to create a concentric spherical cavity to be filled with a liquid as said inner sphere.

5. The sundial according to claim 1, wherein said liquid includes an aqueous copper sulfate solution to filter out heat from sunlight.

6. The sundial according to claim 1, wherein R1, n1, R2, and n2 are selected to meet the following:
   n1 is greater than n2; and
   R2/R1 is greater than $[(n1-n2)/(n1-1)*n2]$.

7. The sundial according to claim 1, wherein said marks of date and time are designed according to a local longitude to correct for a difference between a local solar time and local standard time.

8. The solar compass according to claim 1, wherein said marks of date and time are designed according to a local longitude to correct for a difference between a local solar time and local standard time.

9. A solar compass, said solar compass comprising:
   a rotatable base plate including a first tip for indicating a direction of south and a second tip for indicating a direction of north, said second tip being positioned opposite said first tip on said base plate;
   an omni-directional lens joined with said base plate closer to said first tip than said second tip, said omni-directional lens including at least two concentric spherical components, said at least two concentric spherical components including a transparent outer sphere having a radius R1 and an index of refraction n1 and a transparent inner sphere having a radius R2 and an index of refraction n2; and
   a replaceable panel positioned adjacent said omni-directional lens, said replaceable panel being selected from two replaceable panels, each of said two replaceable panels having a semi-cylindrical shape and a surface with marks of date and time thereon, said surface being oriented so as to face said first tip, a first one of said two replaceable panels including marks of date and time for a first part of a year and a second one of said two replaceable panels including marks of date and time for a second part of the year;
   wherein R1, n1, R2, and n2 are selected so that a parallel beam of sunlight impinging on said omni-directional lens will converge to a sharp spot of light on said replaceable panel and when said base plate is rotated to align said sharp spot of light at a correct time and date on said replaceable panel, said second tip is oriented to point in a direction of true north.

10. The solar compass according to claim 9, further comprising means to adjust an inclination of said replaceable panel to match a local latitude and means to adjust an azimuth angle to match a local longitude, thereby allowing one to correct for a difference between a local solar time and local standard time.

11. The solar compass according to claim 9, wherein said surface is blue.

12. The solar compass according to claim 9, wherein R1, n1, R2, and n2 are selected to meet the following:
    n1 is greater than n2; and
    R2/R1 is greater than $[(n1-n2)/(n1-1)*n2]$.

* * * * *